(12) United States Patent
Magarill (10) Patent No.: US 7,724,436 B2
(45) Date of Patent: May 25, 2010

(54) REFLECTIVE CORRECTOR FOR OPTICAL PROJECTION ENGINE

(75) Inventor: Simon Magarill, Cincinnati, OH (US)

(73) Assignee: 3M Innovative Properties Company, St. Paul, MN (US)

(*) Notice: Subject to any disclaimer, the term of this patent is extended or adjusted under 35 U.S.C. 154(b) by 109 days.

(21) Appl. No.: 11/855,502

(22) Filed: Sep. 14, 2007

(65) Prior Publication Data

US 2008/0068715 A1 Mar. 20, 2008

Related U.S. Application Data

(60) Provisional application No. 60/826,014, filed on Sep. 18, 2006.

(51) Int. Cl.
*G02B 27/10* (2006.01)
*G02B 27/14* (2006.01)

(52) U.S. Cl. .................... 359/618; 359/629

(58) Field of Classification Search .......... 359/618, 359/629, 634, 637, 639, 640; 353/31, 33, 353/34, 39
See application file for complete search history.

(56) References Cited

U.S. PATENT DOCUMENTS

| | | | |
|---|---|---|---|
| 2,403,731 A | | 7/1946 | MacNeille |
| 4,773,748 A | * | 9/1988 | Shih et al. ............... 355/52 |
| 5,098,184 A | | 3/1992 | van den Brandt et al. |
| 5,418,583 A | | 5/1995 | Masumoto |
| 5,506,642 A | * | 4/1996 | Suzuki et al. ............ 353/74 |
| 5,625,738 A | | 4/1997 | Magarill |
| 5,662,401 A | | 9/1997 | Shimizu et al. |
| 5,798,819 A | | 8/1998 | Hattori et al. |
| 5,973,827 A | | 10/1999 | Chipper |
| 6,249,382 B1 | * | 6/2001 | Komatsuda ............ 359/618 |
| 6,429,906 B1 | | 8/2002 | Sekine et al. |
| 6,591,022 B2 | * | 7/2003 | Dewald ............... 353/31 |
| 6,814,450 B2 | | 11/2004 | Kim |

(Continued)

FOREIGN PATENT DOCUMENTS

JP 2002-90874 3/2002

(Continued)

OTHER PUBLICATIONS

U.S. Appl. No. 60/826,014, filed Sep. 18, 2006, Titled: Reflective Corrector for Optical Projection Engine.

(Continued)

*Primary Examiner*—Alicia M Harrington (57) ABSTRACT

A projection engine is disclosed, in which white light from a uniform telecentric source is collimated, polarized, and split into red and cyan beams. The collimated red light passes through a red focuser, which has an off-axis, front-surface mirror that has an aspheric and/or conic profile, and a spherical lens. The collimated cyan light passes through a similar cyan focuser, after which it is split into blue and green beams. The mirror reflective surface has an aspherical shape to minimize aberrations at the edge of the field of view in the illumination optical path. The collimator is at the front focal plane of each focuser, making the emergent converging beam telecentric, and a pixelated panel is at the rear focal plane of each focuser. The reflected light beams from the red, green and blue pixelated panels are superimposed on a pixel-by-pixel basis and are directed to a projection lens.

19 Claims, 4 Drawing Sheets

U.S. PATENT DOCUMENTS

| | | |
|---|---|---|
| 7,085,063 B2 | 8/2006 | Magarill et al. |
| 7,114,816 B2 | 10/2006 | Fujimori et al. |
| 2004/0077567 A1 | 4/2004 | Watt et al. |
| 2004/0150757 A1 | 8/2004 | Sekine et al. |
| 2004/0201829 A1* | 10/2004 | Eckhardt ............... 353/97 |
| 2006/0033888 A1* | 2/2006 | Deppe et al. ............ 353/85 |
| 2006/0203352 A1 | 9/2006 | Pashley |
| 2007/0153397 A1 | 7/2007 | Destain |
| 2008/0049198 A1* | 2/2008 | Vrachan et al. ......... 353/99 |

FOREIGN PATENT DOCUMENTS

| | | |
|---|---|---|
| JP | 16354587 | 12/2004 |
| KR | 100251099 B1 | 1/2000 |
| KR | 10-2004-0019767 A | 3/2004 |
| WO | WO 2004/114003 A1 | 12/2004 |

OTHER PUBLICATIONS

Stupp E., et al. "Projection displays", 1999, pp. 116-121 and 138-139, John Wiley & Sons Ltd., West Susses, England.

Morgenthal M., "Cutting-Edge Products Selected as 2005 Display of the Year Award Winners", Information Display, May 2006, p. 20, vol. 22, No. 5.

* cited by examiner

REFLECTIVE CORRECTOR FOR OPTICAL PROJECTION ENGINE

CROSS REFERENCE TO RELATED APPLICATIONS

This application claims priority from U.S. Provisional Application Ser. No. 60/826,014, filed Sep. 18, 2006 the disclosure of which is incorporated by reference in its/their entirety herein.

FIELD OF THE INVENTION

The present invention is directed to an illumination system architecture of an optical projection engine for a projection system.

BACKGROUND

Projection systems are becoming increasingly more common, and there is an ongoing effort to make them smaller and less expensive.

In typical three-color projection systems, a red image, a green image and a blue image are formed separately and are then superimposed. In some typical systems, light from an extended, uniform, white-light source is first collimated, and is then spectrally divided into red, green and blue portions. The first collimation step minimizes the angular range over which the spectral filters need to operate.

In many of these typical projection systems, the uniform source is roughly imaged onto a pixelated panel that attenuates the beam on a pixel-by-pixel basis. There are generally three such pixelated panels, with one each for red, green and blue light. In a common pixelated panel, for each pixel, liquid crystal is used to rotate the plane of polarization of pre-polarized light in response to an electrical signal, and attenuation is achieved by passing the exiting beam through a polarizer. The beams leaving the three pixelated panels are then combined and imaged by a projection lens onto a screen, which is typically external to the projection engine. In these common systems, the illumination system typically refers to the optical path extending between the uniform source and each of the three pixelated panels.

BRIEF SUMMARY

An optical system is disclosed. Light from an essentially uniform source with a finite spatial extent produces a telecentric divergent beam. A collimator receives the telecentric divergent beam and produces a collimated beam. A focuser receives the collimated beam and produces a telecentric convergent beam. The focuser includes a spherical lens and an off-axis, front-surface mirror having an aspheric shape.

DETAILED DESCRIPTION OF ILLUSTRATIVE EMBODIMENTS

Because the illumination system in a projection system collimates the light leaving the source and then forms an image of the source on the pixelated panels, at least one additional focusing element is required in the illumination path between the collimator and the pixelated panel. Such a focusing element is referred to herein as a "focuser". For a high-performance projection system, it is desirable that the focuser be well-corrected for optical aberrations.

There are several choices for well-corrected focusers, all of which have drawbacks. For instance, one choice is a molded plastic (or polymeric) aspheric lens, which is inexpensive to manufacture. Example plastic materials might include polystyrene, polycarbonate, or polymethylmethacrylate. Unfortunately, the plastic lens has a large amount of stress- and heat-induced birefringence, and in the generally hot environment of a projection system, a plastic lens would unacceptably degrade the polarization state of the illumination beam. Another choice is a molded glass aspheric lens, which has acceptable level of birefringence. Unfortunately, molded glass aspheric lenses are prohibitively expensive in the relatively large sizes required by the illumination systems. Likewise, a conventional ground-and-polished glass lens with an aspheric profile is also prohibitively expensive. The cost of glass lenses drops considerably for strictly spherical surfaces, but then aberration correction becomes more difficult, and it usually requires multiple spherical glass lenses to achieve sufficient correction. The cost savings achieved by using spherical surfaces may be outweighed by having to use multiple lenses in the focuser.

Accordingly, there exists a need for a focuser that can achieve sufficient reduction of optical aberrations through use of an aspherical surface without introducing additional birefringence.

In one type of projection system, light from a source is directed onto a pixelated panel (also known as an imager), such as a Liquid Crystal On Silicon (LCOS) panel. The light reflected from the pixelated panel is then imaged onto a distant screen by a projection lens. In this type of projection system, the pixelated panel is generally tiny, compared to the viewable image on the screen, and it is generally considered desirable to situate the source, the condenser, the pixelated panel, and the intervening optics (excluding the projection lens) in the smallest possible volume with the smallest number of components. This collection of optical components may be referred to as a "projection engine".

In order to simulate color, there are generally three analogous optical paths in the projection engine, corresponding to red, green and blue light. Light from a white-light source is spectrally divided into red, green and blue portions, and each color portion is directed onto its own pixelated panel. Alternatively, multiple light sources (such as LED's) may be provided which emit light in a particular spectrum (e.g. red, green, blue). The light from the selected light source is then collimated. The light reflected from the three pixelated panels is then superimposed on a pixel-by-pixel basis and passes through the projection lens, forming an image with an appropriate range of colors.

Spectral division is preferably done in a collimated portion of the beam. This minimizes the angular range over which the spectral filters operate, and thereby allows for the use of more economical filters. Thus, when the white light is spectrally divided, it is logical to try and perform the division in a telecentric beam to remove virtually all variation in color across the projection screen. In a telecentric beam, the chief rays for all points across the object to be imaged at the image plane of the illumination system are collimated.

The uniform light source may be roughly imaged directly onto the pixelated panels. Because the illumination system first collimates the light leaving the source, then also forms an image of the source on the pixelated panels, to achieve a desirable level of performance, it is preferable to provide at least one additional focusing element in the illumination path between the collimator and the pixelated panel, which will be referred to in this document as a "focuser." For a high-performance projection system, it is desirable that the focuser be well-corrected for optical aberrations. In addition, it is also desirable that the focuser be inexpensive without having undesirable polarization artifacts caused by birefringence. In one implementation of this embodiment, a collimated spectral filter directs a predetermined spectral portion of the collimated beam to the focuser. In another implementation of this embodiment, a telecentric spectral filter directs a predetermined spectral portion of the telecentric convergent beam from the focuser. In this case, a pixelated panel is located essentially at a back focal plane of the focuser for modulating the telecentric convergent beam on a pixel-by-pixel basis.

One exemplary focuser uses a front-surface mirror followed by a spherical glass lens. The front-surface mirror has a fairly shallow curvature and has an aspheric shape so that the combination of the mirror and the spherical glass lens has essentially no aberrations. In this sense, the mirror may be considered a corrector for the illumination path. The front-surface mirror may be made of plastic so that it may be molded and may therefore be relatively inexpensive. Since light does not transmit through a front-surface mirror, any birefringence of the plastic in the mirror does not affect the polarization state of light reflecting off the mirror. In fact, the plastic could be a colored or opaque material, such as a highly-silica-filled polysulfone or Ultem® PolyEtherImide (PEI) (available from Boedeker Plastics, Inc., Shiner, Tex., USA.) The above description of the focuser is merely exemplary, and should not be construed to be limiting in any way. This exemplary focuser and an exemplary optical system that surrounds it are described in greater detail in the figures and the text that follows.

Figure 1:
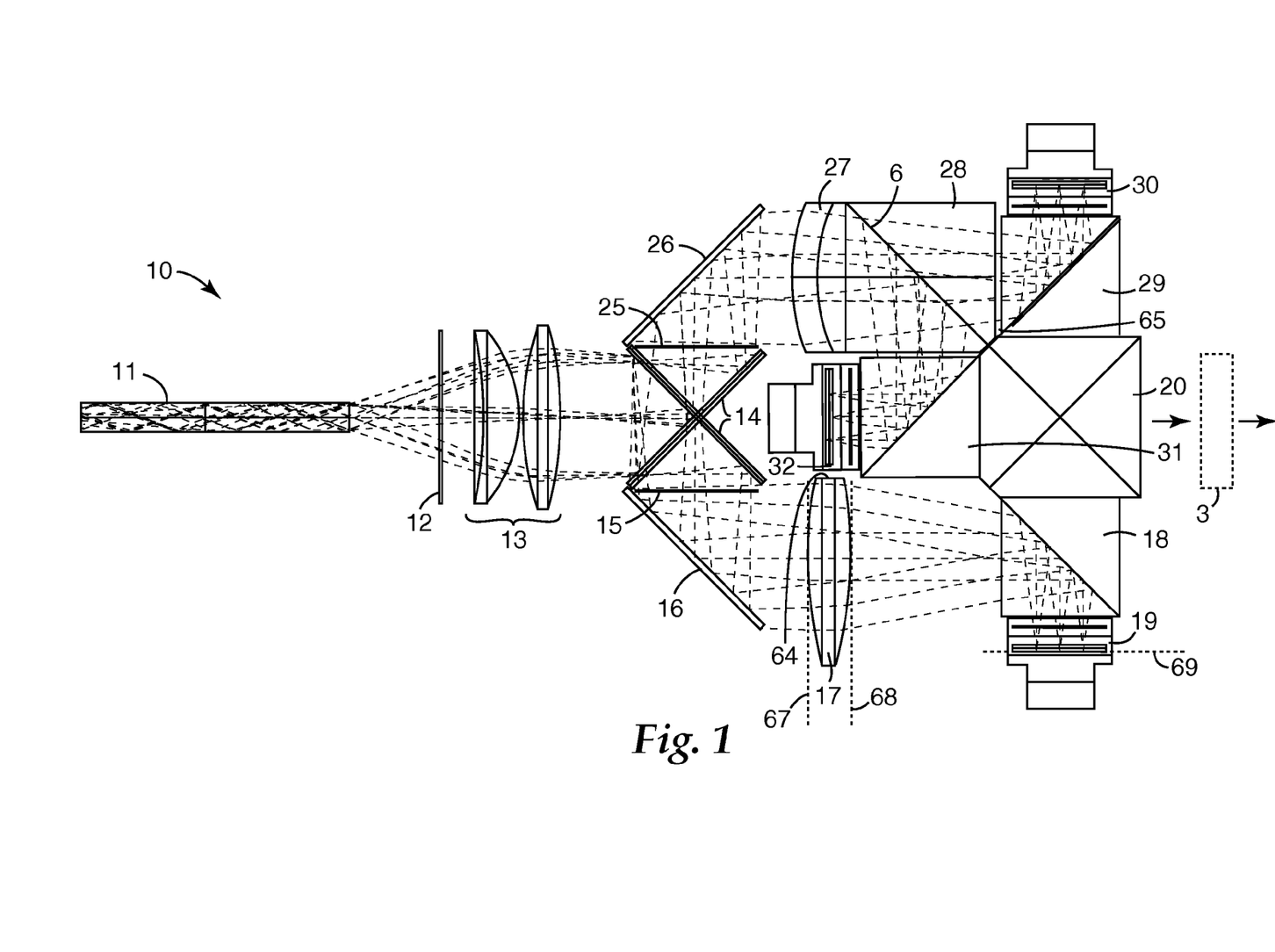
FIG. 1 is a plan drawing of a projection engine.

FIG. 1 shows an exemplary optical projection engine 10. Each component in the optical projection engine 10 is explained in detail in the paragraphs that follow. Light is physically generated by a light-producing element not shown in FIG. 1, such as a light emitting diode, an array of light emitting diodes, an arc lamp, a halogen lamp, a fluorescent lamp, or any other suitable light-producing element. A typical light source for projection application is an Ultra-High Pressure (UHP) mercury arc lamp. The light-producing element emits light with a wide enough spectrum to provide light for dedicated red, green and blue beams. Preferably, the light-producing element emits light over the entire visible spectrum, with sufficient power emitted over the wavelength range of about 400 nm to about 700 nm. The light produced by the light-producing element may be referred to as "white light" in this document Light from the light-producing element may be collected by an optional condenser lens or mirror, and/or an optional reflector, and is coupled into a light homogenizer such as a light tunnel 11. The light homogenizer may be a solid rod or hollow rod (such as light tunnel 11), with a cross-sectional profile that is rectangular, square, hexagonal, trapezoidal, elliptical, round, or has any suitable shape. The tunnel may be tapered, such that the cross section size increases in one or more dimensions from one end of the light tunnel to the other. White light enters the light tunnel 11 from the leftmost end in FIG. 1, and propagates down the length of the light tunnel 11 by multiple reflections (or total internal reflections, if a solid rod) with various angles off the sides of the light tunnel 11. After propagating down the length of the light tunnel 11, the white light diverges from the rightmost end with two characteristics that are essentially uniform over the spatial extent of the end of the light tunnel 11: (1) the perceived brightness (power per area, as a function of area), and (2) the angular distribution of the perceived brightness (power per area per steradian, as a function of two orientational angles). These two quantities are discussed in the following two paragraphs.

Because the perceived brightness is essentially uniform over the entire end of the light tunnel 11, the end of the light tunnel 11 acts as a uniform light source producing a diverging white light, with a finite spatial extent. The shape of the light tunnel 11 may be chosen to match that of the pixelated panels downstream, so that the end of the light tunnel 11 may be imaged with a particular magnification onto the pixelated panels without wasting a significant amount of light. For instance, if the pixelated panel is rectangular with an aspect ratio of 4:3, then the light tunnel 11 may also have a rectangular exit cross-section with an aspect ratio of 4:3.

The angular distribution of the emergent light is constant over the end of the light tunnel 11. Specifically, if the emergent light distribution has an angular center (the axis of the emitted conical beam) and an angular width (such as a full-width-at-half-maximum, or FWHM), and has both of these quantities in the x- and y-dimensions, then all four of these quantities are constant for all locations on the exiting face of the light tunnel 11. This implies that the emission from the light tunnel 11 is telecentric. Furthermore, the angular center of the distribution is roughly parallel to the optical axis (along the z-direction). The exiting face of the light tunnel 11 is perpendicular to the optical axis in the exemplary optical system of FIG. 1, although it may optionally be angled with respect to the optical axis.

Note that the exiting face of the light tunnel 11 may be considered a uniform, telecentric extended light source. The light emergent from the light tunnel 11 is a telecentric divergent beam. Other uniform light sources could include any other light homogenizers, including light integrators, lenslet arrays and so forth.

White light emergent from the light tunnel 11 passes through a pre-polarizer 12. The pre-polarizer 12 may preferably accommodate a large range of incident angles, in order to minimize any variations in transmitted polarization across the beam.

Although any suitable polarizer may be used, a preferable polarizer is a wire grid polarizer. Wire grid polarizers tend to be fairly expensive, with a cost scaling as the polarizer area. They have very high heat resistance, but still can be damaged by heat if located close to the exiting face of the light tunnel 11. In practice, the trade-off between cost and damage determines the actual axial location of the polarizer 12.

Polarized white light emerges from the polarizer 12 and passes through a collimator 13, which produces a collimated white light. In one embodiment, the collimator is made of glass, rather than plastic, so that collimator birefringence does not degrade the polarization of the transmitted beam. The collimator is desirably corrected for spherical aberration. Although a glass aspheric singlet would have sufficient aberration correction, aspheric glass elements are typically quite expensive. A glass doublet with spherical surfaces may be manufactured by conventional grinding and polishing, and can adequately correct for spherical aberration, depending upon the end application. The glass types of the doublet may be the same, or may be different so that chromatic aberration may be corrected as well.

For the purposes of this document, the location of an optical element may be taken to be the location of one or both of its principal planes. The exemplary collimator 13 is a doublet with four optical surfaces, but can be represented by just two principal planes in accordance with typical geometrical optics conventions. For instance, we can say that the exit face of the light tunnel 11 and the collimator 13 are separated by the focal length of the collimator 13, although it is truly the front principal plane of the collimator 13 that is spaced apart from the exiting face of the light tunnel 11 by the focal length of the collimator 13.

Note that the region between the exiting face of the light tunnel 11 and the collimator 13 may be referred to as "telecentric space".

The beam emerging from the collimator 13 is white-light, is polarized, and is nominally collimated, with a range of propagation angles determined by the spatial extent of the exiting face of the light tunnel 11 and the focal length of the collimator 13. For a rectangular exiting face with a corner-to-corner dimension of about ±4 mm, and a collimator focal length of about 30 mm, the range of propagation angles is about ±8 degrees. These values are merely exemplary, and should not be construed as limiting in any way.

After emerging from the collimator 13, the beam strikes a crossed dichroic subassembly 14, which may reflect, for example, cyan light upward and red light downward in FIG. 1. (Alternatively, we could have chosen to send magenta light upward and blue light downward in FIG. 1.) The crossed dichroic subassembly 14 is also referred to herein as a red/cyan dichroic subassembly for spectrally filtering the collimated white light into a red collimated beam and a cyan collimated beam separate from the red collimated beam. The crossed dichroic subassembly 14 may be made from three plano-parallel glass substrates, a first one of which extends the diagonal length of the subassembly, with one of the two remaining substrates on either side of the first one. The substrates are coated so that upon exiting the subassembly, each beam will have reflected once and will have been transmitted once through one of the substrates. One set of coatings transmits in the cyan wavelength band and reflects in the red wavelength band, and the other transmits in the red band and reflects in the cyan band. In this manner, essentially all the light is reflected either up or down, with virtually no light transmitted straight through the subassembly 14. Note that in one embodiment, the coatings operate at an incident angle of 45 degrees +/− the range of propagation angles. The coatings may be designed for either p- or s-polarized incident light.

Note that the terms "cyan" and "red" are used herein to denote relatively short-wavelength light and relatively-long wavelength light, respectively, and should not be construed as limiting. For instance, "cyan" and "red" may be replaced by "magenta" and "blue", respectively. For a three-color system, the precise color coordinates of "red", "green" and "blue" may be varied as needed. The labels of "red channel", "green channel" and "blue channel" denote relatively long wavelengths, relatively moderate wavelengths, and relatively short wavelengths, respectively, regardless of the viewer's perception of the channel color. Furthermore, if more precise color control is required, more than three color channels may be used, including four, five, or more.

Light reflected downward by the crossed dichroic subassembly 14 forms, in this example, the red channel of the projection engine. The red light passes through a red aperture 15, which may be a round, elliptical, or rectangular hole in an opaque material.

The light then reflects off an off-axis, front-surface mirror 16 with an incident angle of about 45 degrees +/− the range of propagation angles. An off-axis optical surface has an optical axis that is not orthogonal to the optical surface. Thus, the chief ray for the object axial point is not orthogonal to the surface.

Mirror 16 may be made from any suitable material having a reflective coating without regard for optical quality and transmission of the material used to make mirror 16. In one implementation of this embodiment, mirror 16 is a molded plastic mirror that is molded into shapes that would be expensive to fabricate in a conventional grind-and-polish manner. The mirror 16 may have a nominally flat curvature (with an infinite radius of curvature), or a relatively shallow curvature (with a relatively large radius of curvature) with a concave or convex profile. In addition, the mirror 16 may have an aspheric component and/or a conic component to its surface profile, which would be expensive to grind and polish, but which is relatively inexpensive in a molded part. The conic constant and/or aspheric terms of higher orders may correct for aberrations in combination with other optical components elsewhere in the optical path. In one implementation of this embodiment, the front-surface mirror 16 has a non-zero conic constant. In another implementation of this embodiment, front-surface mirror 16 has at least one non-zero aspheric coefficient.

The mirror 16 has a high-reflectivity thin-film coating on its front surface, which reflects essentially all of the incident light without having the light enter the mirror substrate. The high-reflectivity thin-film coatings are designed to operate over an incident angle range determined by the spatial extent of the essentially uniform light source and the focal length of the collimator 13. For instance, the mirror 16 may use a coating such as SILFLEX™, which is commercially available from Unaxis Optics, Golden, Colo., USA and Shanghai, P. R. China (headquarters OC Oerlikon Balzers Ltd., LI-9496 Balzers/Liechtenstein). Such a coating has a fairly high reflectivity (typically greater than 98%) for both s- and p-polarizations with an incident angle of about 45 degrees +/− the range of propagation angles. Alternatively, any suitable reflective coating may be used, such as an all-dielectric coating, which minimizes absorption by the coating itself, or an enhanced metallic coating. Also, the mirror can be located on the optical axis of the illumination beam or may be displaced from this axis for better correction of aberrations across the area of the imager.

Figure 7:
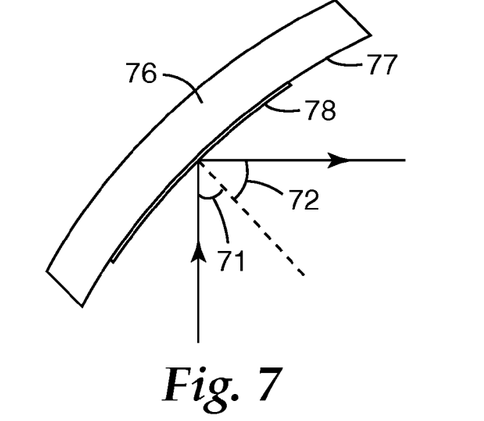
FIG. 7 is a plan drawing of a concave, off-axis, front-surface mirror with a concave aspheric shape.
Figure 8:
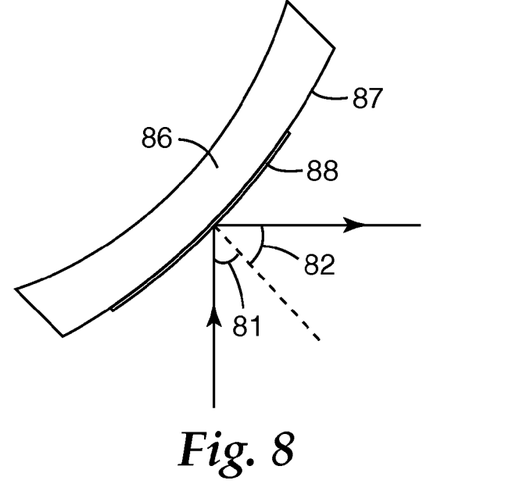
FIG. 8 is a plan drawing of a convex, off-axis, front-surface mirror with a convex aspheric shape.
Figure 9:
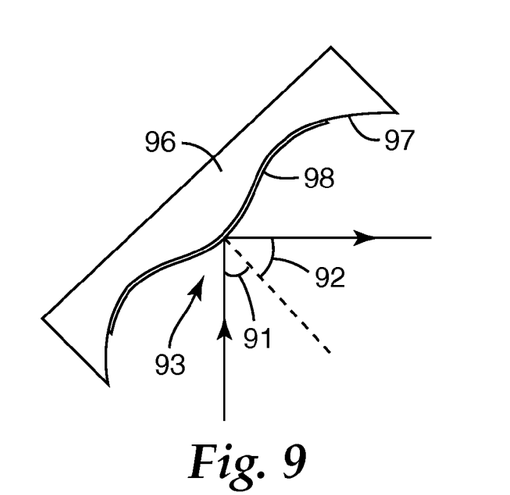
FIG. 9 is a plan drawing of a convex, off-axis, front-surface mirror with a concave aspheric shape.
Figure 10:
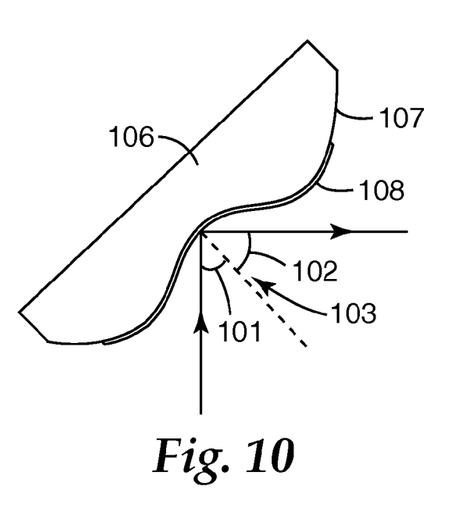
FIG. 10 is a plan drawing of a concave, off-axis, front-surface mirror with a convex aspheric shape.

Exemplary shapes of corrective mirrors 16 and 26 are shown in FIGS. 7-10. The mirrors can be concave (FIG. 7) or convex (FIG. 8) shape with spherical or aspherical profile. In some cases, the shape of these mirrors includes a variable curvature as shown in FIGS. 9 and 10. Other variations are possible.

FIG. 7 is a plan drawing of a concave, off-axis, front-surface mirror 76 with a concave aspheric shape. In the exemplary mirror of FIG. 7, mirror 76 has a front surface 77 with a reflective coating 78, making this a "front-surface mirror." Mirror 76 is an "off-axis" mirror, and the nominal incident ray strikes the mirror at non-normal incidence. In FIG. 7, the nominal incident ray forms an incident angle 71 with the surface normal. Similarly, the nominal exiting ray forms an angle of reflection 72 with the surface normal. Angles 71 and 72 are identical in accordance with basic geometrical optics.

FIG. 8 is a plan drawing of a convex, off-axis, front-surface mirror 86 with a convex aspheric shape. In the exemplary mirror of FIG. 8, mirror 86 has a convex aspheric shaped front surface 87. A reflective coating 88 is on the front surface 87 of the mirror 86 and the nominal incident and exiting ray form a respective incident angle 81 and angle of reflection 82 with the surface normal.

FIG. 9 is a plan drawing of a convex, off-axis, front-surface mirror with a concave aspheric shape. In the exemplary mirror of FIG. 9, mirror 96 has a front surface 97 with a reflective coating 98. As shown in FIG. 9, the portion of the surface 97 that is represented generally by the numeral 93 has a concave aspheric shape. In one implementation of this embodiment, the aspheric shape has a non-zero conic. In another implementation of this embodiment, aspheric shape has at least one non-zero aspheric constant. A reflective coating 98 is on the front surface 97 of the mirror 96 and the nominal incident and exiting rays form a respective incident angle 91 and angle of reflection 92 with the surface normal.

FIG. 10 is a plan drawing of a concave, off-axis, front-surface mirror with a convex aspheric shape. In the exemplary mirror of FIG. 10, mirror 106 has a front surface 107 with a reflective coating 108. As shown in FIG. 10, the portion of surface 107 that is represented generally by the numeral 103 has a convex aspheric shape at. In one implementation of this embodiment, the aspheric shape has a non-zero conic. In another implementation of this embodiment, aspheric shape has at least one non-zero aspheric constant. A reflective coating 108 is on the front surface 107 of the mirror 106 and the nominal incident and exiting ray form a respective incident angle 91 and angle of reflection 92 with the surface normal.

In one implementation of this embodiment, the front-surface mirror 76, 86, 96, or 106 has a non-zero conic constant in one or more portions of the surface 77, 87, 97, or 107, respectively. In another implementation of this embodiment, front-surface mirror 76, 86, 96, or 106 has at least one non-zero aspheric coefficient in one or more portions of the surface 77, 87, 97, or 107, respectively. In yet another implementation of this embodiment, the front-surface mirror 76, 86, 96, or 106 has at least one non-zero aspheric coefficient and at least one non-zero conic constant in one or more portions of the surface 77, 87, 97, or 107, respectively.

Because mirrors 76, 86, 96, and 106 are front-surface mirrors, incident light reflects off the respective coatings 78, 88, 98, and 108 without substantially entering the mirror substrate, so that the mirrors 76, 86, 96, and 106 may be made from a material that need not be optically perfect. For instance, the mirrors 76, 86, 96, and 106 may be made from plastics, which may have birefringence, opacity, or other artifacts that might otherwise degrade the beam quality if it were used in transmission. Note that the degrees of convexity and concavity may be greatly exaggerated in FIGS. 7-10; in practice, they may be barely perceptible or imperceptible to the naked eye.

Note also that the mirror surface opposite the front surfaces 77, 87, 97 and 107 need not have any particular shape. In practice, the surface opposite the front surface may be shaped to accommodate a mechanical mount, and/or may be shaped to maximize the stability of the mirror once it is mounted. Such a surface may be convex, as in FIG. 7, concave as in FIG. 8, or flat as in FIGS. 9 and 10.

Returning to FIG. 1, light reflecting off the mirror 16 passes through a lens 17. A typical lens 17 may be a glass, plano-convex, bi-convex or meniscus singlet with two spherical surfaces or one flat surface and one spherical surface. Such a glass lens may be made relatively inexpensively by conventional grinding and polishing, because there are no aspheric and/or conic terms in the surface profile that would add complexity and cost to the manufacturing process. In comparison with a comparable plastic lens, such a glass lens would exhibit far fewer birefringent effects, and would maintain the polarization quality of a beam transmitted through the lens. Further enhancement in image quality of the illumination system could be achieved by using a doublet rather than a singlet.

The combination of the mirror 16 and the lens 17 is the "focuser" for the red beam, also referred to herein as "red focuser." It is desirable that the red focuser be well-corrected for optical aberrations, so that the mirror 16 and the lens 17 have essentially equal and opposite amounts of aberrations for a particular beam size (such as that determined by the red aperture 15). Both components may be manufactured inexpensively, and neither one degrades the beam with undesirable birefringence effects.

It is beneficial to specifically consider the optical aberrations in the illumination arm, and compare and contrast them to the aberrations in a typical imaging system. For an imaging system (i.e., one in which an image is formed, such as downstream from the pixelated panel), it is usually important that the optics be well corrected both on-axis (usually at the center of the image) and off-axis (usually at the edge or corner of the image). On-axis correction requires that spherical aberration is sufficiently reduced. Off-axis correction requires that the other monochromatic aberrations, such as coma, astigmatism, field curvature and distortion, be well corrected in addition to spherical aberration.

In contrast to a typical imaging system, it is desirable for the illumination arm to have has relatively good aberration correction off-axis, but it can be acceptable to have relatively poor aberration correction on-axis. For instance, such a system is disclosed in U.S. patent application Ser. No. 11/322,958 for Patrick R. Destain, entitled "Projection System With Beam Homogenizer," filed on Dec. 30, 2005, and incorporated by reference in its entirety herein.

This may be understood by considering two characteristics of the illumination arm. First, it is desirable that the edge (or perimeter) of the exit face of the light tunnel 11 be imaged crisply onto the edge (or perimeter) of the pixelated panel. This implies that the monochromatic aberrations, taken in combination at the edge of the field of view, are sufficiently reduced. Second, it is desirable that the imaging at the center of the pixelated panel contain some blurring effects. Because the illumination arm forms an image of the nearly uniform illumination from the exiting face of the light tunnel 11, a blur at the center is virtually undetectable. Furthermore, a blur at the center may even be beneficial, in that dust or other contaminants that might be present on the exiting face of the light tunnel may be blurred out at the pixelated panel and may therefore be undetectable in the projected image.

Specifically, it is desirable that the focuser has reduced aberrations at the edge of the field of view, which may be considered to be a corner of the pixelated panel, or any point along the perimeter of the pixelated panel. The region between the collimator 13 and the lens 17 is referred to herein as "collimated space."

The red focuser has both front and rear principal planes, so both the separation between the front focal plane 66 and the front principal plane 67 and the separation between the rear focal plane 69 and the rear principal plane 68 are equal to the focal length of the red focuser. Because it is desirable that the beam after the lens 17 be telecentric, it is preferable that the front focal plane 66 of the focuser be coincident with the back focal plane of collimator 13. In this telecentric condition, the bundle of rays for a particular image location emerges from the lens 17 parallel to the bundles of rays for all other image locations.

The lens 17 may have suitable anti-reflection coatings on one or both of its surfaces. Optionally, the lens 17 may have on one or both of its surfaces a wavelength-sensitive coating that can fine-tune the spectrum of the red beam. For instance, such a wavelength-sensitive coating may shift one or both edges of the transmitted red spectrum, and/or may tailor the transmitted spectrum, thereby emphasizing or de-emphasizing a particular band of wavelengths.

In order to minimize the volume envelope (i.e. The "footprint", or volumetric area) of the projection engine, the lens 17 may have a truncated edge 64. For instance, the edge of the lens 17 closest to the center of the projection engine may be ground flat, to reduce interference with other optical components in the projection engine. Such a truncation typically occurs outside the clear aperture of the component, so that it does not substantially affect the beam.

The beam exiting the lens 17 enters a polarizing beam splitter (PBS) 18, which reflects one polarization and transmits the other polarization. The beam splitter 18 may be formed on the hypotenuse of a cube prism, or may alternatively be formed on a flat substrate that is inclined at about 45 degrees with respect to the incident beam. Typical polarizing beam splitters reflect s-polarization and transmit p-polarization, although the reflected and transmitted components may alternatively be reversed. Any or all of the air-incident faces may be anti-reflection coated.

The beam leaving the lens 17 is reflected downward in FIG. 1 by the hypotenuse of cube beamsplitter 18, and is directed onto a pixelated panel 19. An exemplary pixelated panel may be a liquid crystal on silicon (LCOS) panel, which can rotate the plane of polarization independently for each pixel in response to a driving electrical signal. If the plane of polarization is not rotated, the light reflected from the pixelated panel retraces the reflected path back toward the focuser lens 17 and does not reach the projected image. If the plane of polarization is rotated by 90 degrees, the light reflected from the pixelated panel transmits through the polarizing beam splitter 18, and passes through a so-called "x-cube" beamsplitter (color combiner) 20 that combines the red beam with analogous blue and green beams and directs it toward a projection lens 3.

The pixelated panel 19 (also known as a red imager 19) is located roughly at the rear focal plane of the red focuser.

Note that the bundles of rays incident on the pixelated panel 19 are telecentric convergent. The beam is telecentric after the focuser (more specifically, after the lens 17), and this telecentricity extends from the focuser to the pixelated panel 19, and further to the projection lens 3. In this manner, the exiting face of the light tunnel 11 is roughly imaged onto the pixelated panel 19.

The description of elements 15 through 19 above pertains to a nominal red channel in the projection engine embodiment described above. There are analogous channels for green and blue light, and these are described briefly below.

White light emerging from the collimator 13 strikes the crossed dichroic subassembly 14, which reflects cyan light upward and red light downward in FIG. 1. Cyan light has a spectrum that includes both green light and blue light, and division of the cyan light into these two spectral components occurs further downstream in the optical path.

Cyan light reflected upward in FIG. 1 from the crossed dichroic subassembly 14 passes through a cyan aperture 25, analogous to the red aperture 15.

Light emerging from the cyan aperture 25 then reflects off a front surface mirror 26, analogous to front surface mirror 16. The front surface 26 mirror may be identical in shape and construction to mirror 16, although different shapes and/or constructions may also be used.

Light reflected off the mirror 26 then passes through a lens 27, which is analogous to lens 17, but may be attached to a blue/green beamsplitter 28 rather than being a stand-alone component. The cyan focuser includes mirror 26 and lens 27, and is analogous in function to the red focuser. The lens 27 and the blue/green beamsplitter 28 comprise a blue/green dichroic subassembly for spectrally filtering the cyan converging beam into a blue converging beam and a green converging beam separate from the blue converging beam.

As with the red focuser, it is desirable that the cyan focuser be well-corrected for optical aberrations. In one implementation of this embodiment, the mirror 26 and the lens 27 have essentially equal and opposite amounts of aberrations for a particular beam size (such as that determined by the cyan aperture 25). Both components may be manufactured inexpensively, and neither one degrades the beam with undesirable birefringence effects.

As with the red channel, the front focal plane 25 of the cyan focuser may preferably be coincident with the back focal plane of the collimator 13, so that the optical path after the cyan focuser is telecentric. The telecentric space extends from the cyan focuser to the blue pixelated panel 30 (also known as a blue imager 30) and green pixelated panel 32 (also known as a green imager), then to the projection lens 3. The rear focal plane of the cyan focuser may be coincident with both the blue pixelated panel 30 and green pixelated panel 32, so that the exiting face of the light tunnel 11 is imaged onto the blue pixelated panel 30 and green pixelated panel 32. Note that the bundles of rays incident on the blue pixelated panel 30 and green pixelated panel 32 are telecentric convergent.

Because there is an extra beamsplitter in the cyan path, as compared to the red path, the focal lengths and distances may be slightly different between the cyan and red channels. The cyan lens 27 may have a slightly different focal length from the red lens 17, although they may preferably have the same focal lengths.

As a result of this effective path length difference, the magnification of the red and cyan channels may be slightly different, leading to a small change in the size of the imaged light tunnel exiting face, leading in turn to a small change in the apparent brightness of the red and cyan channels. In practice, this effect may be quite small and is most likely negligible.

In addition, the reduced optical path length inside the blue/green beamsplitter 28 (reduced by a factor of the refractive index of the beamsplitter) may be sufficient to allow the slightly different focal length and distance requirements of the cyan and red channels to fit into a symmetric volume envelope, as shown in FIG. 1. In other words, the physical distance traveled between the light tunnel and the pixelated panels may be the same for the red and cyan channels, although the optical path length (i.e., the physical distance divided by the refractive index) may be different for the red and cyan channels.

Note that the cyan focuser has front and rear focal and principal plane, analogous in function and placement to those in the red channel, and not shown in FIG. 1.

The cyan lens 27 may be a plano-convex singlet, and may preferably be the same glass type as the blue/green beamsplitter 28. The lens 27 may be glued to the cube beamsplitter 28, or may alternatively be made integral with one of the triangular prisms in the beamsplitter 28.

In one embodiment, the blue/green beamsplitter 28 has a wavelength-sensitive coating on its hypotenuse 6. Preferably, the coating may reflect green light, with wavelengths in the range of about 490 nm to about 570 nm, and transmit blue light, with wavelengths in the range of about 425 nm to about 490 nm. Other wavelength bands or ranges may be used as well. Alternatively, the coating may transmit green light and reflect blue light. Note that the blue/green beamsplitter 28 is in telecentric space, so that variations in color intensity from location to location across the screen are minimized.

In addition, there may optionally be further wavelength-sensitive coatings on the incident face of the lens 27, and/or on either or both of the exiting faces of the beamsplitter 28. These optional coatings can further fine-tune the cutoff wavelengths of the green and blue bands, and may be referred to as "trim filters."

The blue/green beamsplitter 28 may optionally have a truncated corner 65, analogous to the truncated edge of red lens 17. The truncation occurs outside the clear aperture of the beamsplitter 28, and does not significantly affect the transmitted or reflected beams. The truncation does allow the beamsplitter 28 to fit into a smaller volume envelope, thereby making the whole projection engine a bit smaller.

Note that the x-cube 20 and the blue/green beamsplitter 28 may preferably have diagonals in the same plane, although this is not a strict requirement for operation.

From the blue/green beamsplitter 28, the transmitted blue light in this embodiment enters a polarizing beamsplitter 29 and is directed onto a blue pixelated panel 30, while the reflected green light enters a polarizing beamsplitter 31 and is directed onto a green pixelated panel 32. The polarizing beamsplitters 18, 29, and 31 are all analogous in function, and may contain suitable coatings that may or may not be the same for all of the beamsplitters. Likewise, the pixelated panels 19, 30 and 32 may also be similar in construction, and may be properly tuned for the suitable wavelength band of their respective operations. Light reflected from the three pixelated panels is superimposed by the x-cube beamsplitter 20 and is directed toward the projection lens 3. Note that the optical path length from each pixelated panel to the x-cube can be the same for red, green and blue channels, so that all three may be imaged clearly simultaneously; thus, one is not "out of focus" with respect to the others.

Figures 2, 3, 4:
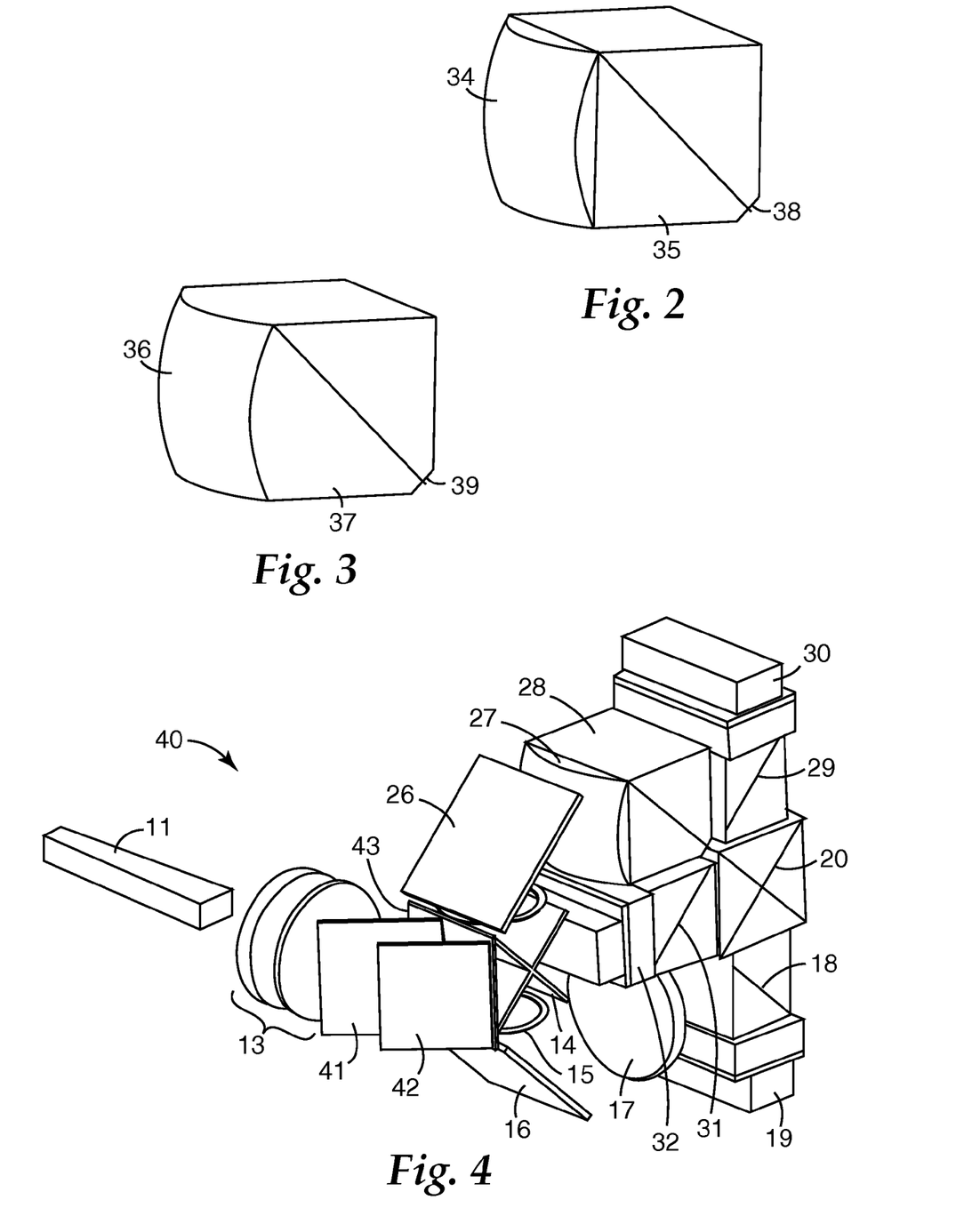
FIG. 2 is an isometric drawing of a lens attached to a blue/green beamsplitter.
FIG. 3 is an isometric drawing of a lens made integral with a blue/green beamsplitter.
FIG. 4 is an isometric drawing of a projection engine with a polarization conversion system.

FIG. 2 shows an isometric view of the lens 34 glued to the blue/green beamsplitter 35. Alternatively, the lens 34 may be optically contacted to the beamsplitter 35 without an adhesive. Similarly, FIG. 3 shows an isometric view of the lens 36 made integrally with one of the prisms in the blue/green beamsplitter 37. Note the optional truncated corners 38 and 39 on each beamsplitter. These components are analogous to cyan lens 27 and blue/green beamsplitter 28 in FIG. 1.

There are various other layouts and component combinations that can use the focusers shown in FIG. 1.

Figure 5:
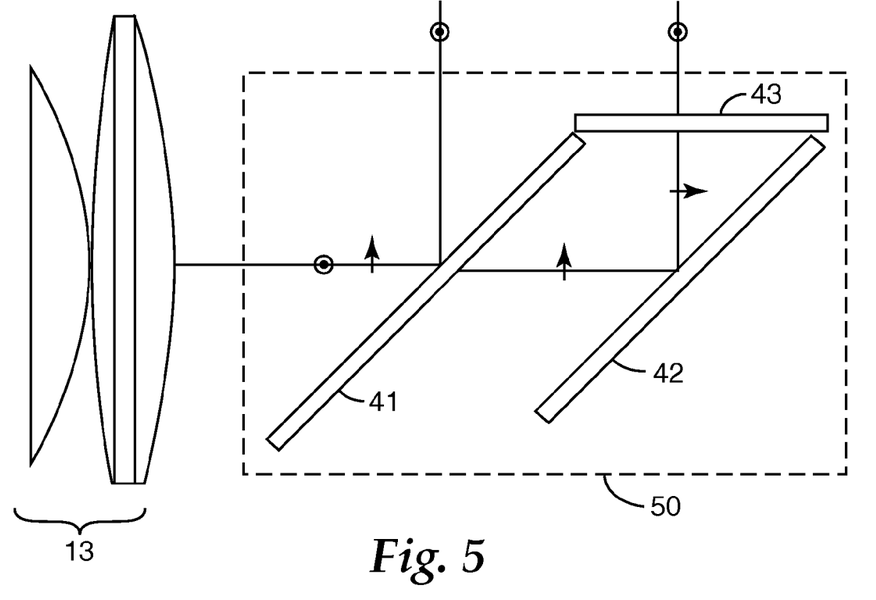
FIG. 5 is a plan drawing of the polarization conversion system of FIG. 4.

For instance, FIGS. 4-5 show a projection engine 40 that uses a so-called "polarization conversion system" 50, rather than a simple polarizer, for the light that exits the light tunnel 11. The polarization conversion system 50 is used after the collimator 13 so that it operates in collimated space, rather than in a diverging beam.

The light emerging from the light tunnel 11 has a randomly oriented polarization, and maintains the random polarization after passing through the collimator 13. The collimated beam then passes through a polarizing beam splitter 41 that reflects s-polarization toward the crossed dichroic subassembly 14 and transmits p-polarization. The transmitted p-polarization light reflects off a mirror 42, passes through a half-wave plate 43 (oriented with its fast axis at 45 degrees to the plane of polarization) that rotates its plane of polarization by 90 degrees, and then is directed to the crossed dichroic subassembly 14 as s-polarization. In this manner, all the light from the light tunnel may be used by the projection engine, instead of half the light as in FIG. 1.

Note that the light from the polarization conversion system 50 may emerge in two halves, in that the light reflected from polarizing beam splitter 41 is directly adjacent to the light reflected from mirror 42. In practice, there may be slight shadowing effects caused by an edge of the polarizing beam splitter 41, which may produce a slight seam between the halves. In general, the slight seam does not significantly affect the image quality. The seam is not conjugate with the exiting face of the light tunnel 11; if it were, it would produce a dip in light intensity on the screen that looks like the seam itself. Furthermore, the seam is not conjugate with the collimator 13, the exit pupil of the collimator 13, or either principal plane of the collimator 13; if it were, it would produce a dip in light intensity at a particular viewing angle. Because the seam is out of focus with respect to both of these conditions, the seam becomes "blurred out" by the mere propagation of the beam, and becomes virtually undetectable.

Note that the half-wave plate 43 produces a half-wave of retardance at a particular wavelength. Typically, this wavelength is chosen to be about 540 nm, which falls in the green channel, to which the eye is most sensitive. Other suitable wavelengths may be used as well.

Note that using a polarization conversion system after the collimator makes it possible to use plastic material for the collimator itself, because in this case light that propagates through the collimator is un-polarized and is not affected by birefringence. This means that instead of two glass lenses we can use one plastic lens with aspherical surface(s), which is equivalent with regard to aberration correction.

Figure 6:
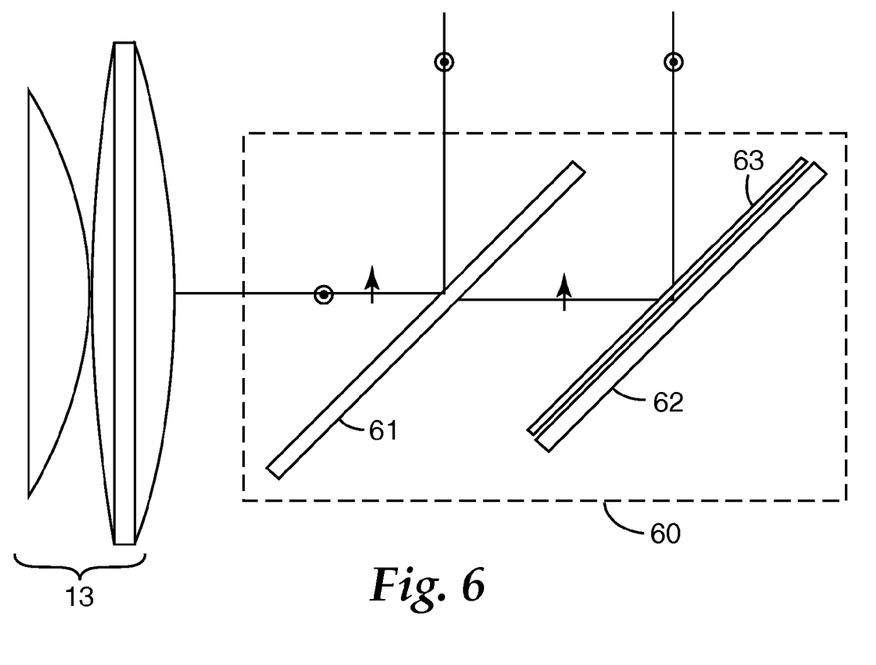
FIG. 6 is a plan drawing of an alternate embodiment of the polarization conversion system of FIG. 4.

Another polarization conversion system 60 is shown in FIG. 6. Light having been collimated by collimator 13 is directed to a polarizing beam splitter 61. After passing through a polarizing beam splitter 61, the beam passes through a quarter-wave 63 plate tilted 45 degrees to the optical axis, with the fast axis of the plate at 45 degrees to the polarization plane. This orientation provides a change in the polarization direction of 90 degrees after the double pass though the quarter-wave plate. This plate may optionally be laminated on the top of a front or rear surface mirror 62, which reduces the complexity of the sub-assembly. The thickness of the quarter wave plate may be selected or adjusted properly to take into account the 45 degree angle of incidence for the light passing through the plate.

There are other layouts for the projection engine that replace the light tunnel with a pair of lenslet arrays, which can optionally use a parabolic mirror as a condenser, and can optionally use a pair of lenses as a beam expander/compressor, in order to achieve a desired size for the effective uniform light source. Each of these layouts uses essentially the same style of off-axis, front-surface mirror that can have an aspheric and/or conic profile, in combination with a spherical lens. In the embodiment in FIG. 1, the lens in the red channel is free-standing, while in the blue-green arm it is attached to or made integral with a blue/green beamsplitter. Any of these components may have a truncated edge or corner, so that the projection engine may fit in a smaller volume envelope.

The following paragraphs provide a detailed numerical example of a projection engine of the style shown in FIG. 1.

The numerical values are merely for illustration, and are not intended to limit the invention in any way.

EXAMPLE

The light tunnel 11 was 50 mm long, with a clear aperture of 6.2 mm (x) by 4.9 mm (y). The exiting face of the light tunnel may be considered a source of uniform illumination. An example device was the Vikuiti™ Hollow Light Tunnel, available from 3M Company, Inc, Saint Paul, Minn., USA.

The separation between the light tunnel 11 and the polarizer 12 was 20.5 mm.

The polarizer 12 was 0.7 mm thick with a clear aperture of 20 mm (x) by 25 mm (y), and was made from a commercially-available wire grid polarizer device known as PROFLUX™ model PPL05, available from MOXTEK, Inc., Orem, Utah, USA.

The separation between the polarizer 12 and the incident face of the collimator 13 was 3.94 mm.

The collimator was a pair of air-spaced, spherical singlet lenses, both made of BK7 glass (refractive index of 1.531 at a wavelength of 400 nm, 1.521 at 500 nm, 1.516 at 600 nm, and 1.513 at 700 nm). The first (leftmost in FIG. 1) lens was bi-convex, with a radius of 80.37 mm on the incident face, and −23.69 mm on the exiting face. The thickness of the first lens was 8 mm, and the diameter of the first lens was 30 mm. The second (rightmost in FIG. 1) lens was meniscus, with a convex radius of 30.81 on the incident face, and a concave radius of 45.81 on the exiting face. The thickness of the second lens was 5 mm, and the diameter of the second lens was 28 mm.

The on-axis separation between the exiting face of the second collimating lens and the on-axis center of the crossed dichroic subassembly 14 was 15.36 mm.

The cyan dichroic was a 1.0 mm thick plate of BK7 glass, with clear aperture of 24 mm (x) by 28 mm (y). The red dichroic top half was a 1.0 mm thick plate of BK7 glass, with a clear aperture of 24 mm (x) by 14.22 mm (y). The red dichroic bottom half was a 1.0 mm thick plate of BK7 glass, with a clear aperture of 24 mm (x) by 13 mm (y).

The mirror 26 was concave, with a radius of 215 mm and a conic constant equal to −360.2. The clear aperture was 26.0 mm (x) by 32.5 mm (y).

The axial separation between the cyan mirror 26 and the cyan lens 27 was 19.93 mm.

The cyan lens 27 was a spherical glass singlet made of SK5 glass (refractive index of 1.606 at a wavelength of 400 nm, 1.595 at 500 nm, 1.589 at 600 nm, and 1.585 at 700 nm). The convex radius of the incident surface was 30 mm, the thickness was 7 mm, and the clear aperture was 24 mm (x) by 30 mm (y).

The cyan lens 27 was in contact with the blue/green beamsplitter 28.

The blue/green beamsplitter 28 was made of SK5 glass, had an axial thickness of 24 mm, and had a clear aperture of 24 mm (x) by 30 mm (y).

The separation between the blue/green beamsplitter 28 and the blue PBS 29 was 3.32 mm.

The blue PBS 29, as well as the green PBS 31 and red PBS 18, were all made of SK5 glass with a clear aperture of 30 mm (x) by 17.5 mm (y).

While not part of this example, the PBS may use polarization-separating layer may be a multilayer optical film reflective polarizer, such as those used in the Vikuiti™ High Performance LCOS Optical Core, available from 3M Company, Inc, Saint Paul, Minn., USA, and described in patents such as U.S. Pat. Nos. 5,962,114 and 6,721,096. Other polarizing beamsplitters may be used, such as the MacNeille-type PBS described in, for example, U.S. Pat. No. 2,403,731, or a MOXTEK wire grid polarizer, described above.

The red mirror 16 was identical to the cyan mirror 26. The on-axis separation between the red mirror 16 and the red lens 17 was 29 mm.

The red lens 17 was a spherical, bi-convex glass singlet made of SK5 glass. The radius of the incident surface was 25.28 mm, the radius of the exiting surface was 278.47 mm, the thickness was 8 mm, and the clear aperture was 32 mm.

The axial separation between the exiting face of the red lens 17 and the red PBS 18 was 17.25 mm.

The above parameters were designed to work with a pixelated panel of size 13.56 mm by 7.6 mm, or a 0.7-inch diagonal, and an effective F-number of 2.3.

These numerical values were merely examplary, and should not be construed as limiting in any way.

The description of the invention and its applications as set forth herein is illustrative and is not intended to limit the scope of the invention. Variations and modifications of the embodiments disclosed herein are possible and practical alternatives to and equivalents of the various elements of the embodiments would be understood by those of ordinary skill in the art upon study of this patent document. These and other variations and modifications of the embodiments disclosed herein may be made without departing from the scope and spirit of the invention.

The invention claimed is:

1. An optical system, comprising:
   an essentially uniform light source having a finite spatial extent for producing a telecentric divergent beam;
   a collimator for receiving the telecentric divergent beam and producing a collimated beam;
   a polarization conversion system for modifying the polarization state of the collimated beam; and
   a focuser for receiving the collimated beam and producing a telecentric convergent beam;
   wherein the focuser includes a spherical lens and an off-axis, front-surface mirror having an aspheric shape, the front-surface mirror being made of plastic.

2. The optical system of claim 1, wherein the focuser has reduced aberrations at the edge of the field of view.

3. The optical system of claim 1, wherein the front-surface mirror and the spherical lens have essentially equal and opposite aberration contributions at the edge of the field of view.

4. The optical system of claim 1, wherein the front-surface mirror is concave.

5. The optical system of claim 1, wherein the front-surface mirror has a non-zero conic constant.

6. The optical system of claim 1, wherein the front-surface mirror has at least one non-zero aspheric coefficient.

7. The optical system of claim 1, wherein the front-surface mirror includes a high-reflectivity thin-film coating.

8. The optical system of claim 7, wherein the high-reflectivity thin-film coating operates over an incident angle range determined by the spatial extent of the essentially uniform light source and a focal length of the collimator.

9. The optical system of claim 1, wherein a back focal plane of the collimator is located essentially at a front focal plane of the focuser.

10. The optical system of claim 1, further comprising a pixelated panel located essentially at a back focal plane of the focuser for modulating the telecentric convergent beam on a pixel-by-pixel basis.

11. The optical system of claim 10, further comprising a projection lens for forming an image of the pixelated panel.

12. An optical system, comprising:
an essentially uniform light source for producing diverging white light;
a collimator for receiving the diverging white light and producing collimated white light;
a red/cyan dichroic subassembly for spectrally filtering the collimated white light into a red collimated beam and a cyan collimated beam separate from the red collimated beam;
a red focuser for receiving the red collimated beam and producing a red converging beam;
a cyan focuser for receiving the cyan collimated beam and producing a cyan converging beam;
a blue/green dichroic subassembly for spectrally filtering the cyan converging beam into a blue converging beam and a green converging beam separate from the blue converging beam;
a red imager for receiving the red converging beam;
a blue imager for receiving the blue converging beam; and
a green imager for receiving the green converging beam;
wherein the blue/green dichroic subassembly is formed inside a glass element, and wherein at least one of the red focuser, the cyan focuser or the blue/green dichroic assembly has a truncated edge.

13. The optical system of claim 12, wherein the blue/green dichroic subassembly is formed along the hypotenuse of a glass prism.

14. The optical system of claim 12, wherein at least a portion of the cyan focuser is integral with the blue/green dichroic subassembly.

15. The optical system of claim 12, wherein at least a portion of the cyan focuser is attached to the blue/green dichroic subassembly.

16. The optical system of claim 12,
wherein the blue/green dichroic subassembly transmits the blue converging beam and reflects the green converging beam; and
wherein the red/cyan dichroic subassembly reflects the red collimated beam, and reflects the cyan collimated beam in a direction opposite the reflected red collimated beam.

17. The optical system of claim 12, wherein the blue/green dichroic subassembly transmits light having a wavelength in the range of about 425 nm to about 490 nm, and reflects light having a wavelength in the range of about 490 nm to about 570 nm.

18. An optical system, comprising:
an essentially uniform light source having a finite spatial extent for producing a telecentric divergent beam;
a collimator for receiving the telecentric divergent beam and producing a collimated beam;
a focuser for receiving the collimated beam and producing a telecentric convergent beam; and
a collimated spectral filter for directing a predetermined spectral portion of the collimated beam to the focuser;
wherein the focuser includes a spherical lens and an off-axis, front-surface mirror having an aspheric shape, the front-surface mirror being made of plastic.

19. An optical system, comprising:
an essentially uniform light source having a finite spatial extent for producing a telecentric divergent beam;
a collimator for receiving the telecentric divergent beam and producing a collimated beam;
a focuser for receiving the collimated beam and producing a telecentric convergent beam; and
a telecentric spectral filter for directing a predetermined spectral portion of the telecentric convergent beam from the focuser;
wherein the focuser includes a spherical lens and an off-axis, front-surface mirror having an aspheric shape, the front-surface mirror being made of plastic.

* * * * *